(12) United States Patent
Singer et al.

(10) Patent No.: US 11,641,314 B2
(45) Date of Patent: May 2, 2023

(54) SERVICE LEVEL OBJECTIVE PLATFORM

(71) Applicant: NOBL9 INC., Waltham, MA (US)

(72) Inventors: Brian Singer, Needham, MA (US); Alex Nauda, Melrose, MA (US); Jakub Gruszecki, Sulechów (PL); Jakub Warczarek, Poznan (PL); Grzegorz Agacinski, Poznan (PL)

(73) Assignee: NOBL9 INC., Waltham, MA (US)

( * ) Notice: Subject to any disclaimer, the term of this patent is extended or adjusted under 35 U.S.C. 154(b) by 31 days.

(21) Appl. No.: 17/380,440

(22) Filed: Jul. 20, 2021

(65) Prior Publication Data

US 2023/0021600 A1    Jan. 26, 2023

(51) Int. Cl.
*H04L 41/5006* (2022.01)
*H04L 41/069* (2022.01)
*H04L 41/5009* (2022.01)
*H04L 41/5019* (2022.01)
*H04L 41/50* (2022.01)

(52) U.S. Cl.
CPC ........ *H04L 41/5006* (2013.01); *H04L 41/069* (2013.01); *H04L 41/5016* (2013.01); *H04L 41/5019* (2013.01); *H04L 41/5032* (2013.01)

(58) Field of Classification Search
CPC ............... H04L 41/5006; H04L 41/069; H04L 41/2016; H04L 41/5019; H04L 41/5032
USPC ...................................................... 709/224
See application file for complete search history.

(56) References Cited

U.S. PATENT DOCUMENTS

| | | | |
|---|---|---|---|
| 11,190,419 B1 * | 11/2021 | Priescu | H04L 41/5019 |
| 11,451,455 B2 * | 9/2022 | Ganguli | H04L 41/5009 |
| 2007/0192150 A1 * | 8/2007 | Belkin | G06Q 10/06 370/242 |
| 2019/0157837 A1 * | 5/2019 | Doussiere | H01S 5/4087 |
| 2020/0052979 A1 * | 2/2020 | Clemm | H04L 41/5019 |
| 2020/0142822 A1 * | 5/2020 | Dawson | G06F 11/3442 |
| 2020/0404051 A1 * | 12/2020 | Guniguntala | H04L 41/5009 |
| 2021/0075707 A1 * | 3/2021 | Kumar | H04L 43/067 |
| 2021/0112428 A1 * | 4/2021 | Young | H04W 76/11 |
| 2021/0144050 A1 * | 5/2021 | Fagan | H04L 45/28 |
| 2021/0173670 A1 * | 6/2021 | Borra | G06F 11/3466 |
| 2021/0349749 A1 * | 11/2021 | Guha | H04L 43/0882 |
| 2021/0357280 A1 * | 11/2021 | Long | G06F 11/3442 |
| 2022/0232579 A1 * | 7/2022 | Lee | H04L 41/5054 |

* cited by examiner

*Primary Examiner* — Tauqir Hussain
(74) *Attorney, Agent, or Firm* — Lando & Anastasi, LLP

(57) ABSTRACT

Techniques for generating and monitoring service level objectives (SLOs) are disclosed. The techniques include an SLO platform performing: storing a first SLO definition of a first SLO including a first error budget for a first metric associated with a first service; storing a second SLO definition of a second SLO including a second error budget for a second metric associated with a second service; obtaining first telemetry data from a first data source associated with the first service; obtaining second telemetry data from a second data source associated with the second service; monitoring the first SLO at least by computing the first metric based on the first telemetry data and evaluating the first metric against the first error budget; and monitoring the second SLO at least by computing the second metric based on the second telemetry data and evaluating the second metric against the second error budget.

14 Claims, 16 Drawing Sheets

```
> sloctl help
All available commands for execution are listed below.
Use this tool to work with definitions of SLO in YAML files.
For every command more detailed help is available.

Usage:
  sloctl [command]

Available Commands:
    apply        apply SLO definition in system from YAML file
    config       Set default project
    configure    Configure credentials
    delete       Delete SLO definition by name or definition file.
    get          Display one or many resources
    help         Help about any command
    version      Print the sloctl version Flags:
  -A, --all-projects   displays objects from all projects
      --config string  config file path (without this flag checks firstly for $PWD/.sloctl.yaml, next $HOME/.sloctl.yaml)
  -h, --help           help for sloctl
  -p, --project string project context Use "sloctl [command] --help" for more information about a command.
~/Downloads
```

FIG. 5A

```
> sloctl get slos -p external
- apiVersion: n9/v1alpha
  kind: SLO
  metadata:
     displayName: api-request-san-francisco
     name: api-request-san-francisco
     project: external
  spec:
    alertPolicies: [ ]
    budgetingMethod: Occurrences
    description: ""
    indicator:
      metricSource:
        name: cooperlab
        project: default
      rawMetric:
        newRelic:
          nrql: SELECT average(duration) FROM SyntheticCheck WHERE monitorName='API
            Sample' AND locationLabel='San Francisco, CA, USA' TIMESERIES
    objectives:
    - displayName: ok
      op: lt
      tag: external.api-request-san-francisco.400d000000
      target: 0.99
      value: 400
    service: external-apis
    timeWindows:
    - count:1
      isRolling: true
      period:
         begin: "2021-03-21T15:15:00Z"
         end: "2021-03-22T15:15:00Z"
      unit: Day
- apiVersion: n9/v1alpha
  kind: SLO
  metadata:
     displayName: api-request-south-korea
     name: api-request-south-korea
```

FIG. 5B

SERVICE LEVEL OBJECTIVE PLATFORM

BACKGROUND

In computer technology, the performance of many services (e.g., hardware, software, and/or firmware-based services) may vary based on factors such as network congestion, load, changes to dependent services, etc. For example, service performance may degrade or even fail due to a hardware failure, network issue, configuration change, code change, change to an upstream service, increased or decreased user demand, etc. Entities (e.g., individuals and organizations) providing and/or using services often seek assurances that the services will perform at an acceptable level. Such assurances may be memorialized, for example, in a service level agreement (SLA). A service level objective (SLO) is a specific, measurable performance characteristic for which such assurances may be sought.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to service level objectives.

SUMMARY

In general, in one aspect, one or more non-transitory computer-readable media store instructions that, when executed by one or more processors, cause the one or more processors to perform operations including: storing, by a service level objective (SLO) platform, a first SLO definition of a first SLO including a first error budget for a first metric associated with a first service; storing, by the SLO platform, a second SLO definition of a second SLO including a second error budget for a second metric associated with a second service; obtaining, by the SLO platform, first telemetry data from a first data source associated with the first service; obtaining, by the SLO platform, second telemetry data from a second data source associated with the second service; monitoring, by the SLO platform, the first SLO at least by computing the first metric based on the first telemetry data and evaluating the first metric against the first error budget; and monitoring, by the SLO platform, the second SLO at least by computing the second metric based on the second telemetry data and evaluating the second metric against the second error budget.

The operations may further include: storing, by the SLO platform, an alert policy associated with the first SLO; while monitoring the first SLO, determining that the alert policy is satisfied; and responsive to determining that the alert policy is satisfied, generating an alert. The SLO platform may be a software-as-a-service (SaaS) platform for multiple tenants, the first SLO and the first service being associated with a first tenant in the multiple tenants, and the second SLO and the second service being associated with a second tenant in the multiple tenants. The first metric may be one of a threshold metric and a ratio metric. The first metric may be the ratio metric, and the first SLO definition may include (a) a first query to obtain a numerator value based on the first telemetry data and (b) a second query to obtain a denominator value based on the first telemetry data. The first SLO definition may further include a time window, the time window being one of a rolling time window or a calendar-based time window. The first error budget may be calculated based on at least one of a target number of events in the time window that satisfy a performance criterion or a target number of time slices in the time window that satisfy the performance criterion.

In general, in one aspect, a system includes at least one device including a hardware processor. The system is configured to perform operations including: storing, by a service level objective (SLO) platform, a first SLO definition of a first SLO including a first error budget for a first metric associated with a first service; storing, by the SLO platform, a second SLO definition of a second SLO including a second error budget for a second metric associated with a second service; obtaining, by the SLO platform, first telemetry data from a first data source associated with the first service; obtaining, by the SLO platform, second telemetry data from a second data source associated with the second service; monitoring, by the SLO platform, the first SLO at least by computing the first metric based on the first telemetry data and evaluating the first metric against the first error budget; and monitoring, by the SLO platform, the second SLO at least by computing the second metric based on the second telemetry data and evaluating the second metric against the second error budget.

The operations may further include: storing, by the SLO platform, an alert policy associated with the first SLO; while monitoring the first SLO, determining that the alert policy is satisfied; and responsive to determining that the alert policy is satisfied, generating an alert. The SLO platform may be a software-as-a-service (SaaS) platform for multiple tenants, the first SLO and the first service being associated with a first tenant in the multiple tenants, and the second SLO and the second service being associated with a second tenant in the multiple tenants. The first metric may be one of a threshold metric and a ratio metric. The first metric may be the ratio metric, and the first SLO definition may include (a) a first query to obtain a numerator value based on the first telemetry data and (b) a second query to obtain a denominator value based on the first telemetry data. The first SLO definition may further include a time window, the time window being one of a rolling time window or a calendar-based time window. The first error budget may be calculated based on at least one of a target number of events in the time window that satisfy a performance criterion or a target number of time slices in the time window that satisfy the performance criterion.

In general, in one aspect, a method includes: storing, by a service level objective (SLO) platform, a first SLO definition of a first SLO including a first error budget for a first metric associated with a first service; storing, by the SLO platform, a second SLO definition of a second SLO including a second error budget for a second metric associated with a second service; obtaining, by the SLO platform, first telemetry data from a first data source associated with the first service; obtaining, by the SLO platform, second telemetry data from a second data source associated with the second service; monitoring, by the SLO platform, the first SLO at least by computing the first metric based on the first telemetry data and evaluating the first metric against the first error budget; and monitoring, by the SLO platform, the second SLO at least by computing the second metric based on the second telemetry data and evaluating the second metric against the second error budget.

The method may further include: storing, by the SLO platform, an alert policy associated with the first SLO; while monitoring the first SLO, determining that the alert policy is satisfied; and responsive to determining that the alert policy is satisfied, generating an alert. The SLO platform may be a software-as-a-service (SaaS) platform for multiple tenants, the first SLO and the first service being associated with a first tenant in the multiple tenants, and the second SLO and the second service being associated with a second tenant in the multiple tenants. The first metric may be one of a threshold metric and a ratio metric. The first metric may be the ratio metric, and the first SLO definition may include (a) a first query to obtain a numerator value based on the first telemetry data and (b) a second query to obtain a denominator value based on the first telemetry data. The first SLO definition may further include a time window, the time window being one of a rolling time window or a calendar-based time window. The first error budget may be calculated based on at least one of a target number of events in the time window that satisfy a performance criterion or a target number of time slices in the time window that satisfy the performance criterion.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIGS. 3A-3G illustrate examples of a user interface for generating and monitoring service level objectives according to an embodiment;

FIGS. 5A-5B illustrate examples of a user interface including a command line tool according to an embodiment.

DETAILED DESCRIPTION

1. System Architecture

Figure 1:
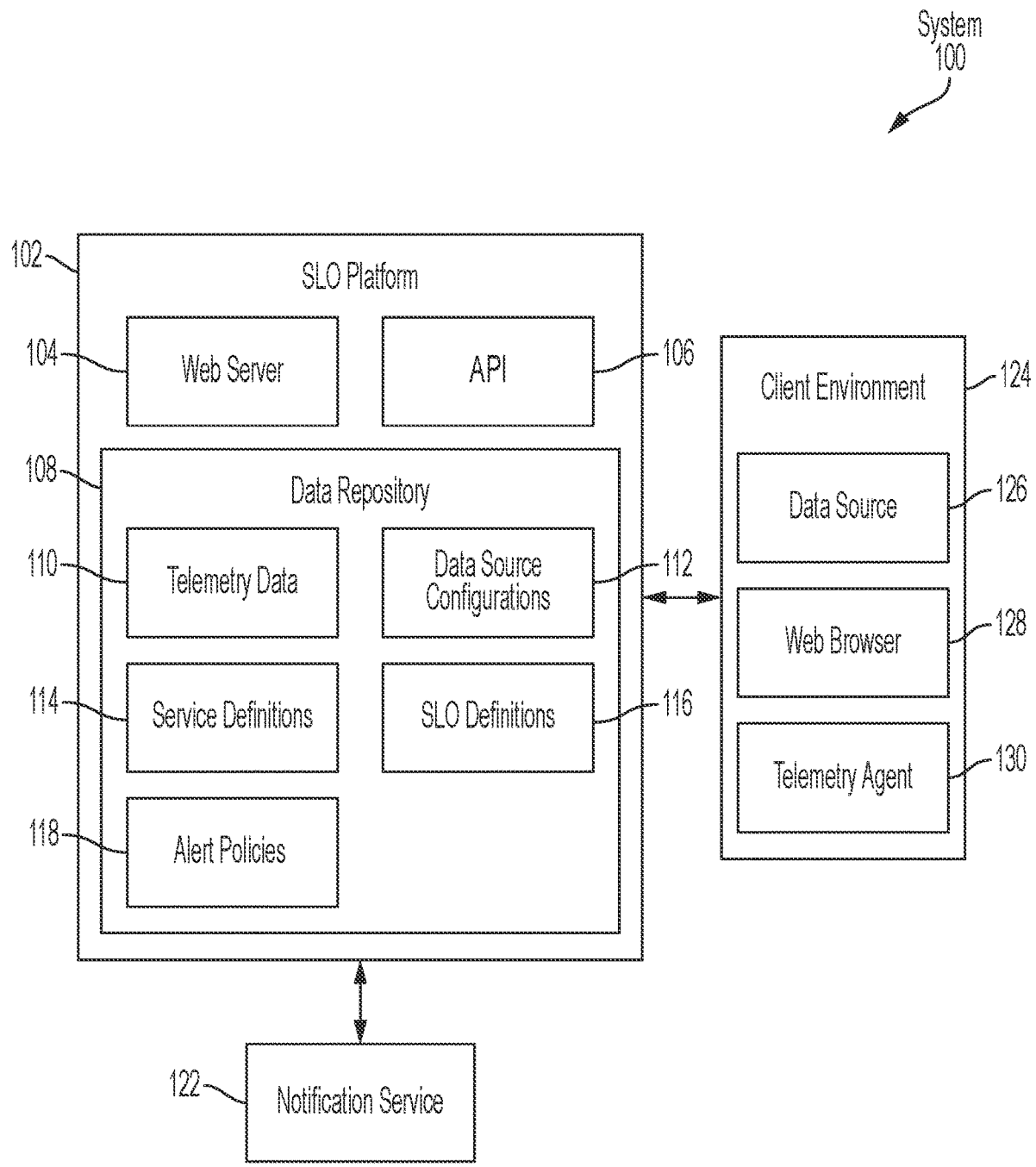
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

An SLO platform 102 refers to a set of hardware, software, and/or firmware configured to perform operations described herein for generating and monitoring SLOs. The SLO platform 102 may be a software-as-a-service (SaaS) platform supporting SLO services for multiple tenants. Alternatively, the SLO platform 102 may be configured to support only a single tenant; for example, the SLO platform 102 may be installed in a data center and used to generate and monitor SLOs for that data center only.

A client environment 124 refers to a hardware, software, and/or firmware environment including a data source 126 that provides data to be tracked as part of an SLO. For example, the data source 126 may include a database, a web server, an API, an event log, a router, a virtual machine, a network controller, a hypervisor, and/or another kind of data source or combination thereof. A data source 126 may be a monitoring and/or instrumentation solution (e.g., Prometheus, Datadog, New Relic, or another kind of monitoring and/or instrumentation solution) installed in the client environment 124. Data obtained from the data source 126 may include one or more of: response times; hypertext transfer protocol (HTTP) response codes; numbers and/or times of requests; available storage; used storage; available memory; used memory; central processing unit (CPU) usage; available bandwidth; used bandwidth; read/write speeds; error messages; inventory data; and/or another kind of data or combination thereof. A single SLO may be based on data from multiple data sources 126, which may be located in the same client environment 124 or across two or more client environments. A telemetry agent 130 in the client environment 124 may be configured to obtain data (e.g., response times, HTTP response codes, numbers and/or times of requests, available storage, used storage, available memory, used memory, central processing unit (CPU) usage, available bandwidth, used bandwidth, read/write speeds, error messages, inventory data, network roundtrip latency, transport layer security (TLS) negotiation times, domain name system (DNS) lookup times, times to first byte and/or times to last byte of a data transfer, error codes, percentiles and/or quantiles of a metric within a timeframe (e.g., 95th percentile of latency), data freshness, data quality metrics, and/or another kind of data or combination thereof) from a data source 126 and transmit the data (either in original form, or in a normalized and/or summary form) to the SLO platform 102.

The telemetry agent 130 may be part of the SLO platform 102, i.e., a component installed in the client environment 124 specifically for the purpose of performing telemetry for the SLO platform 102. Alternatively, the telemetry agent 130 may not be part of the SLO platform 102, but may support push and/or pull data transmission to the SLO platform 102. The client environment 124 may include multiple telemetry agents 130, which may be of the same kind or different kinds, configured to obtain data from multiple data sources 126. Telemetry agents 130 may support load balancing and/or scaling, to ensure that an appropriate number of telemetry agents 130 is operating based on the amount and rate of data being generated by the data source 126. Alternatively or additionally, the SLO platform 102 may be configured to obtain data from the data source 126 by scraping, querying, or observing an API endpoint of the data source. For example, a telemetry agent 130 may operate in the SLO platform 102 rather than the client environment 124, and may be provided with credentials to obtain telemetry data 110 from the data source 126 over a network.

As illustrated in FIG. 1, processing of data from the data source 126 (e.g., generating SLO metrics, evaluating telemetry data against an SLO, etc., as discussed in further detail herein) is performed by the SLO platform 102, apart from the client environment 124. Alternatively or additionally, some or all of the processing of data from the data source 126 may be performed within the client environment 124. For example, one or more software components in addition to a telemetry agent 130 may operate within the client environment 124 to perform one or more operations described herein for processing telemetry data 110 obtained by the telemetry agent 130. In some embodiments, the SLO platform 102 in its entirety operates in the client environment 124. In other embodiments, some or all of the SLO platform 102 may be offered as a remote hosted service.

In an embodiment, the SLO platform 102 is configured to make functionality of the SLO platform 102 available to the client environment 124 via one or more interfaces. The SLO platform 102 may include a web server 104 configured to make functionality of the SLO platform 102 available via one or more web pages. For example, the web server 104 may be configured to generate user interfaces such as those illustrated in FIGS. 3A-3F and 4A-4C. The client environment 124 may include a web browser 128 configured to access the web page(s). Alternatively or additionally, the SLO platform 102 may include an application programming interface (API) 106 configured to make functionality of the SLO platform 102 available via one or more API calls. For example, the API may support calls from a command line tool installed in the client environment 124. An example of a command line tool is discussed in further detail below.

The SLO platform 102 includes a data repository 108 configured to store data used to generate and monitor SLOs. In general, the data repository 108 may include any type of storage unit and/or device (e.g., a file system, database, collection of tables, or any other storage mechanism) for storing data. The data repository 108 may include multiple different storage units and/or devices. For example, some data (e.g., SLO definitions 116) may be stored in a relational database such as PostgreSQL, and other data (e.g., telemetry data 110) may be stored in a specialized time series database such as InfluxDB. Many different storage configurations are possible. The multiple different storage units and/or devices may or may not be of the same type or located at the same physical site. Further, the data repository 108 may be implemented or may execute on the same computing system as one or more other components of the system 100. Alternatively or additionally, the data repository 108 may be implemented or executed on a computing system separate from one or more other components of the system 100. The data repository 108 may be logically integrated with one or more other components of the system 100. Alternatively or additionally, the data repository 108 may be communicatively coupled to one or more other components of the system 100 via a direct connection or via a network. In FIG. 1, a data repository 108 is illustrated as storing various kinds of information. Some or all of this information may be implemented and/or distributed across any of the components of the system 100. However, this information is illustrated within the data repository 108 for purposes of clarity and explanation.

In an embodiment, the SLO platform 102 supports storing data in multiple locations. For example, a user may have the option of storing SLO definitions 116 and/or other data in an external repository (e.g., a git repository or another external code repository) and/or hosted by the SLO platform 102.

The data repository 108 may be configured to store telemetry data 110 obtained from one or more telemetry agents 130 and/or by querying or scraping an API endpoint of a data source 126. As noted above, the telemetry data 110 may include one or more of: response times; numbers and/or times of requests; available storage; used storage; available memory; used memory; central processing unit (CPU) usage; available bandwidth; used bandwidth; read/write speeds; error messages; inventory data; and/or another kind of data or combination thereof. The telemetry data 110 may include data for multiple tenants of the SLO platform 102. The SLO platform 102 may be configured to normalize data obtained from a data source 126 before storing the data as telemetry data 110. For example, the SLO platform 102 may be configured to evaluate data associated with an event (e.g., an HTTP request and response or other kind of event) and determine whether the event is a "good" event or a "negative" event.

The data repository 108 may be configured to store one or more data source configurations 112. A data source configuration 112 includes information about data sources 126 that are available for defining SLOs, such as their names, descriptions, types of data provided, ownership, and/or other kinds of information about a data source 126. If the SLO platform 102 obtains data from a telemetry agent 130 operating in the client environment 124, then the data source configurations 112 may not need to include credentials for accessing the data source 126. The telemetry agent 130 may be configured to transmit data out of the client environment 124 without ever allowing access by the SLO platform 102 into the client environment 124, thus helping preserve data security for tenants of the SLO platform 102.

The data repository 108 may be configured to store one or more service definitions 114. A service definition 114 includes information about a service. As used herein, a "service" represents a distinct logical boundary in the client environment 124. For example, a service may represent a user experience or journey (i.e., a set of steps followed by a user to complete a particular task), an internal API, an external API, or another kind of logical boundary. A data source 126 provides information about data passing through the boundary, thus allowing for an SLO to be defined based on the service. For example, if the data source 126 is part of a service desk application, a service may be defined as creating a ticket. That service may rely on a user service, a queue, a notification service, and a database service, one or more of which may have their own respective service definitions 114. A service may be composed of multiple services. A service definition 114 may include one or more labels that provide metadata associated with the service. For example, a label may be used to define team ownership, upstream and/or downstream dependencies, service categories, and/or other kinds of metadata. Service definitions 114 may include one or more service groupings that group multiple services into higher-level abstractions (e.g., kinds or categories of services).

A service definition 114 may be defined manually, via a user interface (e.g., web browser 128) and/or by generating a file using a predetermined language and syntax for service definitions 114 (e.g., using YAML Ain't Markup Language (YAML), extensible markup language (XML), and/or another kind of language according to a predetermined syntax). Alternatively or additionally, the SLO platform 102 may be configured to automatically discover a service, based on one or more rules for detecting services associated with a given data source 126, and generate a corresponding service definition 114. Using automatic service discovery, the SLO platform 102 may be configured to update the service definitions 114 as the service(s) available in the client environment 124 are added or removed.

The data repository may be configured to store one or more SLO definitions 116. An SLO definition 116 includes information about an SLO. As used herein, an SLO is a target value or range of values for one or more quantifiable performance criteria. Quantifiable performance criteria may also be referred to as service level indicators (SLIs). An SLI is a metric based on telemetry data 110 obtained from the client environment 124. An SLI may combine data from multiple data sources 126. An SLO definition 116 indicates the service(s) for which the SLO is defined. The SLO definition 116 may also indicate one or more data sources 126 from which to use telemetry data 110 for the SLO.

An SLO definition 116 indicates one or more metrics (also referred to as service level indicators (SLIs)) to track as part of the SLO. A metric may be a threshold metric that evaluates telemetry data 110 against an upper or lower threshold value. For example, a time series of telemetry data 110 may be evaluated against a threshold metric. Alternatively, a metric may be a ratio metric that evaluates a ratio of one set of telemetry data 110 to another set of telemetry data 110. For example, one time series of telemetry data 110 may be compared with another time series of telemetry data 110 (e.g., a ratio of successful HTTP requests to total HTTP requests). A metric may be defined as a combination of two or more sub-metrics. Alternatively, a metric may be another kind of metric.

For a given metric, an SLO definition 116 may indicate a query to apply to telemetry data 110 or a data source 126, to obtain that metric. For a ratio metric, two queries may be defined: one for the numerator and one for the denominator. For example, if the ratio metric is a ratio of successful HTTP requests to total HTTP requests, then one query may obtain a count of successful HTTP requests, and another query may obtain a count of total HTTP requests. As another example, for a ratio metric based on data from Datadog, a query of "successful" or "good" requests may be described in YAML as:

```
avg:trace.http.request.duration{service:my-service}
    .as_count( )
``` and a query of total requests may be described in YAML as:

```
avg:trace.http.request.hits
    .by_http_status{service:my-service}.as_count( )
```

As still another example, the following is an example of a metric, described in YAML, for a Prometheus data source:

```
indicator:
    metricSource:
        name: my-prometheus-instance
        project: default
    rawMetric:
        prometheus:
            promql: server_requestMsec{job="nginx"}
```

Some other examples of information that may be queried include, but are not limited to:
- For a web service or API, HTTP secure (HTTPS) responses with 2xx (successful) and 3xx (redirects) status codes.
- For a queue consumer, successful processing of a message.
- For a serverless and function-based architecture, successful completion of an invocation.
- For batch processing, a normal exit (e.g., rc==0) of a process or script.
- For a browser application, completion of a particular user action without JavaScript errors.

An SLO definition 116 may indicate a time window against which the SLO is to be evaluated. A time window may be a rolling time window (e.g., the most recent N seconds, minutes, hours, days, weeks, etc.). A rolling time window may be helpful, for example, for tracking recent user experience of a service. Alternatively, a time window may be a calendar-aligned time window (e.g., a particular date range, week(s) of the year, month(s) of the year, quarter, year, etc.). A calendar-aligned time window may be helpful, for example, for mapping an SLO to business metrics that are measured on the same calendar-aligned basis. Alternatively or additionally, a time window may indicate some other kind of time boundary or combination thereof (e.g., only weekends or weekdays, certain hours of the day, etc.).

The following is an example of a 28-day rolling time window described in YAML:

```
timeWindows:
    - count: 28
      isRolling: true
      period:
          begin: "2020-12-01T00:00:00Z"
      unit: Day
```

An SLO definition 116 may indicate an error budget for the SLO. An error budget indicates one or more criteria by which the SLO is to be evaluated, based on one or more performance criteria defined as values of one or more metrics. An error budget may be occurrence-based, i.e., based on a target ratio of (a) the number of occurrences of an event that satisfy a performance criterion for the metric to (b) the number of total event occurrences. For example, an occurrence-based error budget may define a target percentage of successful HTTP requests, or a target percentage of network requests that do not exceed a threshold response time. Alternatively or additionally, an error budget may be based on time slices, i.e., based on a target ratio of (a) a number of time slices (e.g., seconds, minutes, etc.) within a time window where a service satisfies the performance criterion for the metric and (b) the total number of time slices in the time window.

The following is an example of a budget being specified as occurrence-based in YAML:

```
budgetingMethod: Occurrences
```

An error budget may have a name, which may describe a condition where the performance criterion is not satisfied. For example, an error budget that requires 95% of requests to complete within 100 ms, where failure could be described as "laggy," may be described in YAML as:

```
budgetTarget: 0.95
displayName: Laggy
value: 100
```

In the example above, the "value" is the performance criterion for falling within the error budget. Multiple error budgets may be defined for the same SLO definition 116. For example, a service may be expected to complete requests within 100 ms at least 95% of the time, and within 200 ms at least 99% of the time.

The following is an example of a complete SLO definition 116, described in YAML. For this SLO, in a 28-day rolling window, 95% of requests are required to be completed within 100 ms (above which is described as "laggy"); 99% of requests are required to be completed within 250 ms (above which is described as "slow"); and 99.9% of requests are required to be completed within 500 ms (above which is described as "painful"):

```
- apiVersion: n9/v1alpha
  kind: SLO
  metadata:
    displayName: Example Latency SLO
    name: example-latency-slo
    project: default
  spec:
    alertPolicies: [ ]
    budgetingMethod: Occurrences
    description: ""
    indicator:
      metricSource:
        name: my-prometheus-instance
        projects: default
      rawMetric:
        prometheus:
          promql: server_requestMsec{job="nginx"}
    service: my-rest-api
    thresholds:
      - budgetTarget: 0.95
        displayName: Laggy
        value: 100
      - budgetTarget: 0.99
        displayName: Slow
        value: 250
      - budgetTarget: 0.999
        displayName: Painful
        value: 500
    timeWindows:
      - count: 28
        isRolling: true
        period:
          begin: "2020-12-01T00:00:00Z"
          unit: Day
```

The data repository may be configured to store one or more alert policies 118. An alert policy 118 defines one or more criteria for generating an alert, based on one or more SLO definitions 116. An alert policy may include multiple alert criteria. An alert criterion may be based on an error budget, e.g., when an event does not satisfy the performance criterion. Alternatively or additionally, an alert criterion may be based on a remaining error budget, i.e., when the remaining error budget falls below a certain threshold. Alternatively or additionally, an alert criterion may be based on an error budget burn rate, i.e., how fast the error budget is being consumed by events that do not satisfy one or more performance criteria. When an alert policy 118 is satisfied, the SLO platform 102 is configured to generate an alert. To generate an alert, the SLO platform 102 may be configured to use its own messaging service (not shown) and/or an external notification service 122 (e.g., PagerDuty or another external notification service). An alert policy 118 may also include an alert severity and/or identify one or more intended recipients.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

2. Example Operations

Figure 2A:
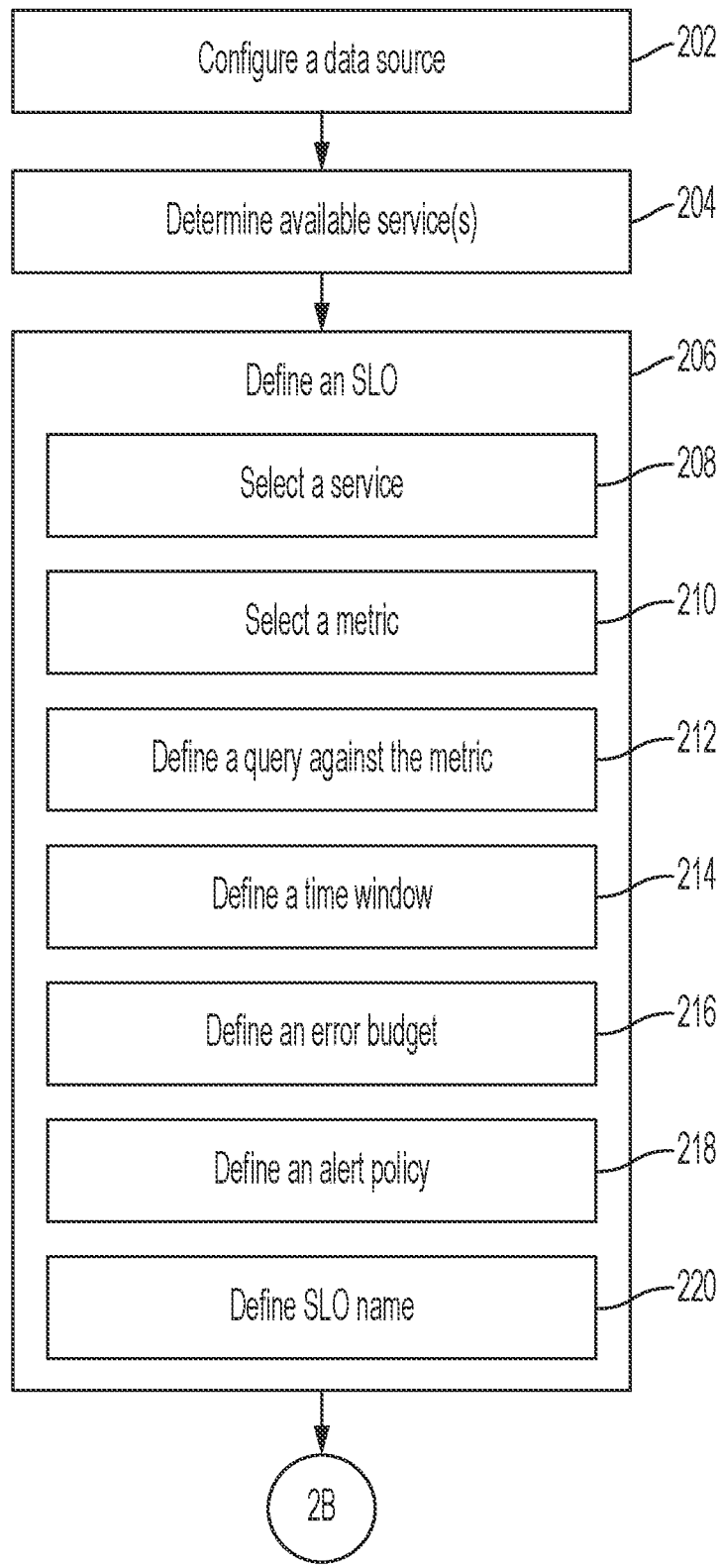
FIGS. 2A-2B are a flow diagram of an example of operations for generating and monitoring service level objectives according to an embodiment.
Figure 2B:
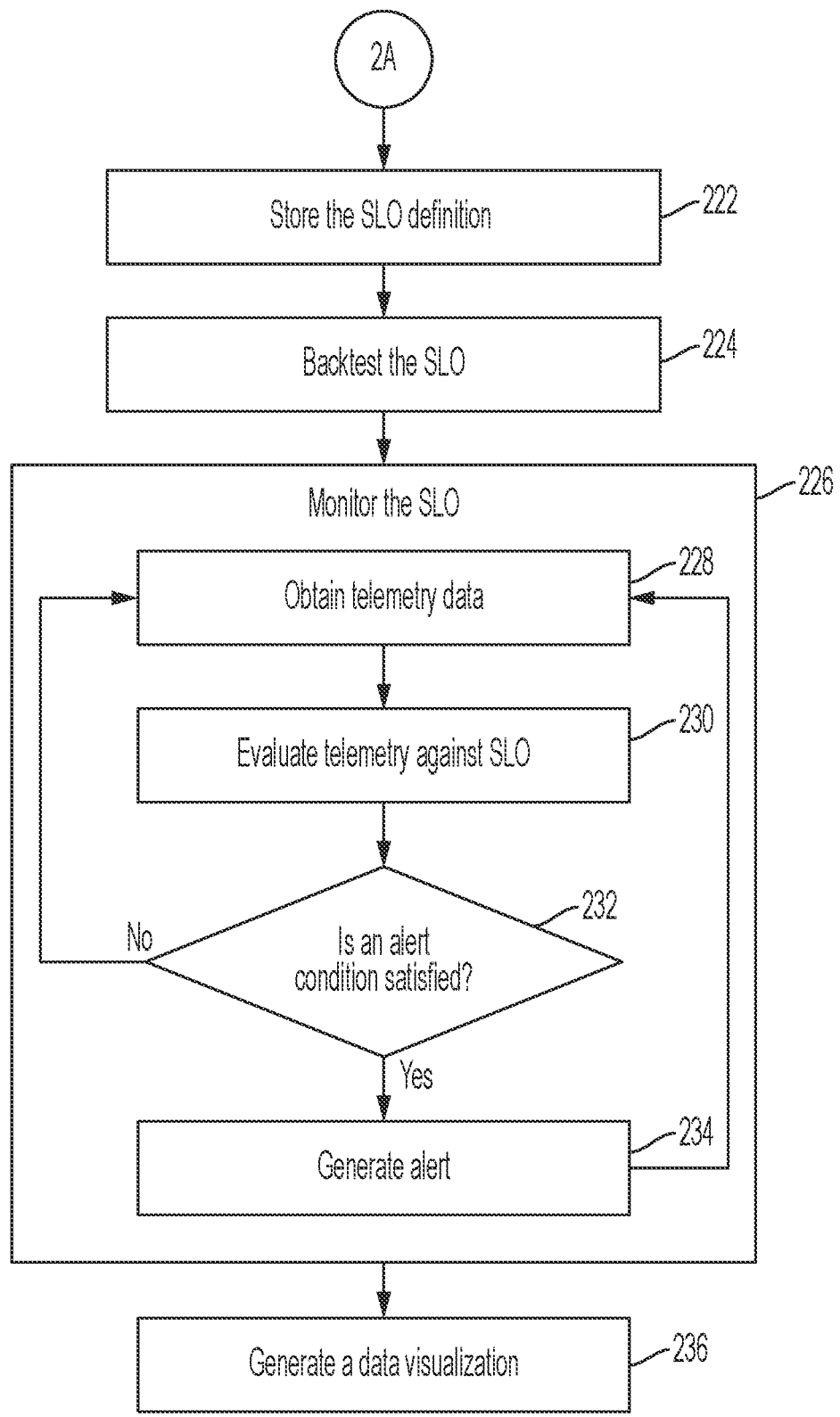

FIGS. 2A-2B are a flow diagram of an example of operations for generating and monitoring service level objectives according to an embodiment. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

As discussed above, SLOs may be evaluated based on data from one or more data sources. An SLO platform may configure a data source (Operation 202) for use with one or more SLOs. Configuring a data source includes storing information about the data source, such as its name, description, types of data provided, ownership, and/or other kinds of information about the data source. Configuring a data source may include installing a telemetry agent in a client environment. Alternatively or additionally, configuring a data source may include storing information about an API endpoint that provides access to the data source, such as a uniform resource indicator (URI), private or public key, username, password, etc.

The SLO platform may determine which service(s) is/are available (Operation 204). As noted above, a service may be defined manually, via a user interface and/or by generating a file using a predetermined language and syntax for service definitions (e.g., using YAML Ain't Markup Language (YAML), extensible markup language (XML), and/or another kind of language according to a predetermined syntax). Alternatively or additionally, the SLO platform may be configured to automatically discover a service, based on one or more rules for detecting services associated with a given data source, and generate a corresponding service definition.

The SLO platform defines an SLO (Operation 206) for a given service, which includes one or more metrics based on telemetry from one or more data sources. Based on the available data sources and services, the SLO platform may be configured to recommend one or more SLOs. For example, for a service associated with a web server, the SLO platform may recommend an SLO for response time and another SLO for good versus bad requests. Alternatively or additionally, the SLO platform may guide a user through selecting one or more components of an SLO. Alternatively or additionally, the SLO platform may receive some or all of an SLO definition as a premade file, for example a YAML file.

Defining an SLO may include selecting a service (Operation 208). Selecting a service may include presenting a list, table, or other representation of available services and receiving user input indicating which service to use.

Defining an SLO may include selecting a metric (Operation 210). The SLO platform may be configured to recommend one or more metrics, based on the selected service. For example, if the selected service is associated with a web server, the SLO platform may recommend response time, numbers of requests receiving particular HTTP response codes, and/or another metric typically associated with web servers.

Defining an SLO may include defining a query against the metric (Operation 212). For a ratio metric, two queries may be defined: one for the numerator and one for the denominator.

Defining an SLO may include defining a time window (Operation 214) against which the SLO is to be evaluated. For example, as discussed in further detail above, a time window may be a rolling time window, a calendar-aligned time window, or indicate some other kind of time boundary or combination thereof. Defining the time window may include defining the type of time window (e.g., rolling, calendar-based, or other) and a value for the window (e.g., 28 days or one or more date ranges).

Defining an SLO may include defining an error budget (Operation 216). For example, as discussed above, an error budget may be occurrence-based or based on time slices. Defining an error budget may include defining the type of error budget calculation (e.g., occurrence-based or time slice), a target for the error budget (e.g., a certain number or absolute percentage of events), and a performance criterion that indicates when a metric falls within the error budget (e.g., for response time, a number of milliseconds).

Defining an SLO may include defining an alert policy (Operation 218). An alert policy includes one or more criteria for generating an alert. For example, as discussed above, an alert policy may be based on an error budget target, a remaining error budget, and/or an error budget burn rate. Alternatively or additionally, an alert policy may be based on one or more other criteria. Defining the alert policy may include specifying how the alert should be sent (e.g., a particular messaging system) and/or one or more intended recipients.

Defining an SLO may include defining an SLO name (Operation 220). An SLO name may be a locally unique identifier for the SLO definition (i.e., local to a tenant and/or the SLO platform as a whole). The SLO platform may require the SLO name to adhere to a certain syntax. For example, the SLO platform may require the SLO name to be in all lowercase letters separated only by dashes, or another syntax may be required.

Turning to FIG. 2B, the SLO platform stores the SLO definition (Operation 222). The SLO platform may host the storage, or may use one or more external repositories (e.g., github). The SLO platform may use a particular storage location responsive to user input indicating where SLO definitions for that user (or for an entity associated with the user) should be stored. The SLO platform may store the SLO definition using YAML, XML, or another language or combination thereof.

In an embodiment, the SLO platform is able to backtest SLOs (Operation 224). To backtest an SLO, the SLO platform may apply the SLO (i.e., based on the SLO definition) to historical telemetry data. The SLO platform may thus determine how the SLO would have performed, if it had been in use at that time. For example, the SLO platform may backtest an SLO to determine whether the SLO would have detected a service degradation or impending failure.

Once an SLO is defined, the SLO platform may monitor the SLO (Operation 226). To monitor the SLO, the SLO platform obtains telemetry data (Operation 228) from the data source(s) indicated in the SLO definition. The SLO platform evaluates the telemetry data against the SLO (Operation 230). Specifically, the SLO platform computes the relevant metric(s) and evaluates the metric(s) against the error budget(s) specified in the SLO definition.

In an embodiment, the SLO platform evaluates telemetry data "on-the-fly," i.e., on an ongoing basis, as it obtains telemetry data from telemetry agents. Alternatively, the SLO platform may store telemetry data in a data repository (e.g., a database) and query the data repository for telemetry data to evaluate at predetermined intervals and/or when a threshold condition is satisfied (e.g., a certain amount of telemetry data has been received and stored in the data repository). Evaluating telemetry data on-the-fly may allow for performance and functionality improvements over approaches that rely on delayed evaluation of stored telemetry data. For example:

1. Evaluating telemetry data on-the-fly allows for horizontal scaling of the SLO platform, i.e., adding more computing resources to handle incoming telemetry data. Because horizontal scaling is possible, the SLO platform's data storage requirements may be less than if the SLO platform needed to store telemetry data while waiting for free resources to query a data repository.

2. Evaluating telemetry data on-the-fly allows for evaluations that are more reflective of current conditions, versus storing data to be evaluated at a later time. The SLO platform may employ a first-in-first-out (FIFO) approach, incrementally computing SLO metrics as new data arrives. The SLO platform may accordingly be able to generate charts and/or other kinds of visualizations that reflect current conditions relative to an SLO, and/or generate relevant alerts in a more timely manner.

3. Evaluating telemetry data on-the-fly allows the SLO platform to adapt to a wide variety of situations that may arise during SLO monitoring. For example, data may arrive irregularly, and/or some events may occur so infrequently that only sparse telemetry data is available to evaluate. On-the-fly evaluation (e.g., using a FIFO approach as described above) can accommodate a wide variety of telemetry data and make a best-effort attempt at evaluating the telemetry data available at any given time.

As discussed herein, an SLO definition may include a time window (e.g., a rolling time window and/or a calendar-based time window). To accommodate time window-based evaluation of an SLO, the SLO platform may store a backup of raw telemetry data (e.g., in cloud object storage and/or another location) from one or more data sources, as the telemetry data arrives from the data source(s). The SLO platform may store the state of the data elements needed to calculate SLO metrics incrementally as new data arrives. The state that the SLO platform needs to store for each SLO may depend, for example, on the SLO's particular configuration, such as the time window and/or error budget calculation type indicated by the SLO definition. During startup (i.e., initial startup and/or restarting) of the software component(s) configured to evaluate SLOs, the SLO platform may restore the state from the backup. In an embodiment, this approach allows for persistent state between sessions, by storing the raw data needed to continue evaluating the SLO, without requiring all telemetry data to be stored indefinitely in a data repository.

As a result of evaluating the telemetry data against the SLO, the SLO platform may determine whether an alert condition is satisfied (Operation 232) and, if the alert condition is satisfied, generate an alert (Operation 234). The SLO platform may continue to monitor the SLO until the SLO is disabled or another termination condition is reached (e.g., if the SLO definition specifies that the SLO should apply only for a certain amount of time). As noted above, the SLO platform may be a multi-tenant platform that provides SLO generation and monitoring services for multiple tenants. Accordingly, the SLO platform may monitor multiple SLOs for multiple tenants concurrently.

The SLO platform may be configured to generate one or more data visualizations (Operation 236) that provide insights into SLO monitoring. For example, the data visualization(s) may provide historical information about performance criteria, error budget statuses, and/or other information associated with SLOs. Some non-limiting examples of data visualizations are described below.

In general, in an embodiment, techniques described herein provide a technical solution to the technical problem of ensuring that services perform adequately according to predetermined performance requirements. Generating and monitoring SLOs, as described herein, facilitates detection of system conditions that do not satisfy those requirements. Error budgets allow for SLOs to be defined precisely, and for alerts to be based at least in part on the budget value(s). In addition, offering SLO generation and monitoring services in a multi-tenant SaaS platform means that individual tenants do not need sophisticated knowledge of SLO generation and monitoring techniques; they can access the functionality via intuitive, feature-rich interfaces provided by the SLO platform.

3. User Interface Examples

Detailed examples are described below for purposes of clarity. Components and/or operations described below should be understood as examples that may not be applicable to one or more embodiments. Accordingly, components and/or operations described below should not be construed as limiting the scope of one or more embodiments.

3.1. Generating and Monitoring SLOs

FIGS. 3A-3G illustrate examples of a user interface 300 for generating and monitoring service level objectives according to an embodiment. In this example, the user interface 300 is a web application having multiple pages, sections, and workflows.

Figure 3A:
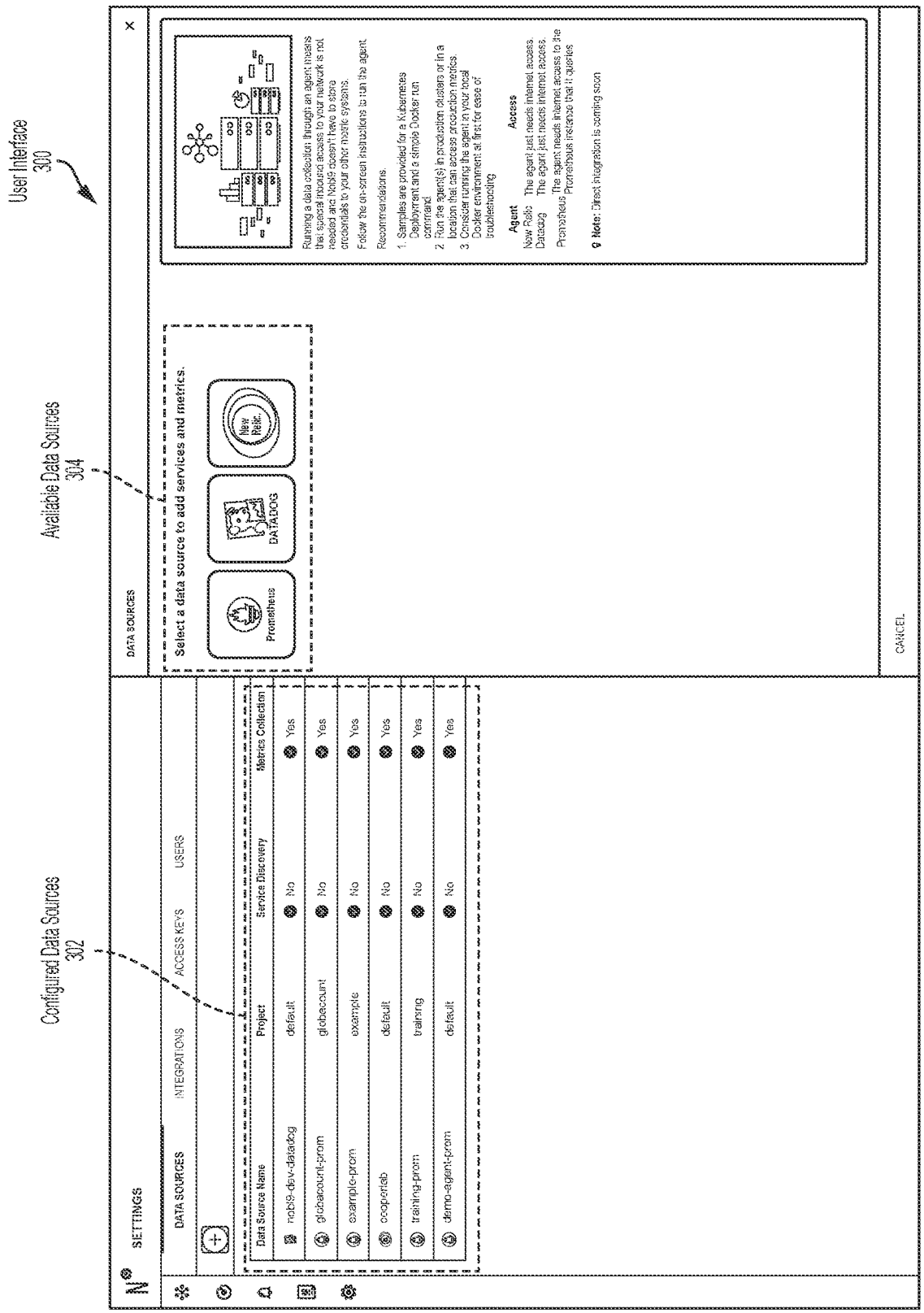

FIG. 3A illustrates an example of managing data sources in the user interface 300. Specifically, in FIG. 3A, a list of configured data sources 302 is provided. For each data source, the list indicates a project associated with the data source, whether the data source supports service discovery, and whether metrics are collected from the data source. FIG. 3A also illustrates an example of available data sources 304, from which a user can select to configure a new data source.

Figure 3B:
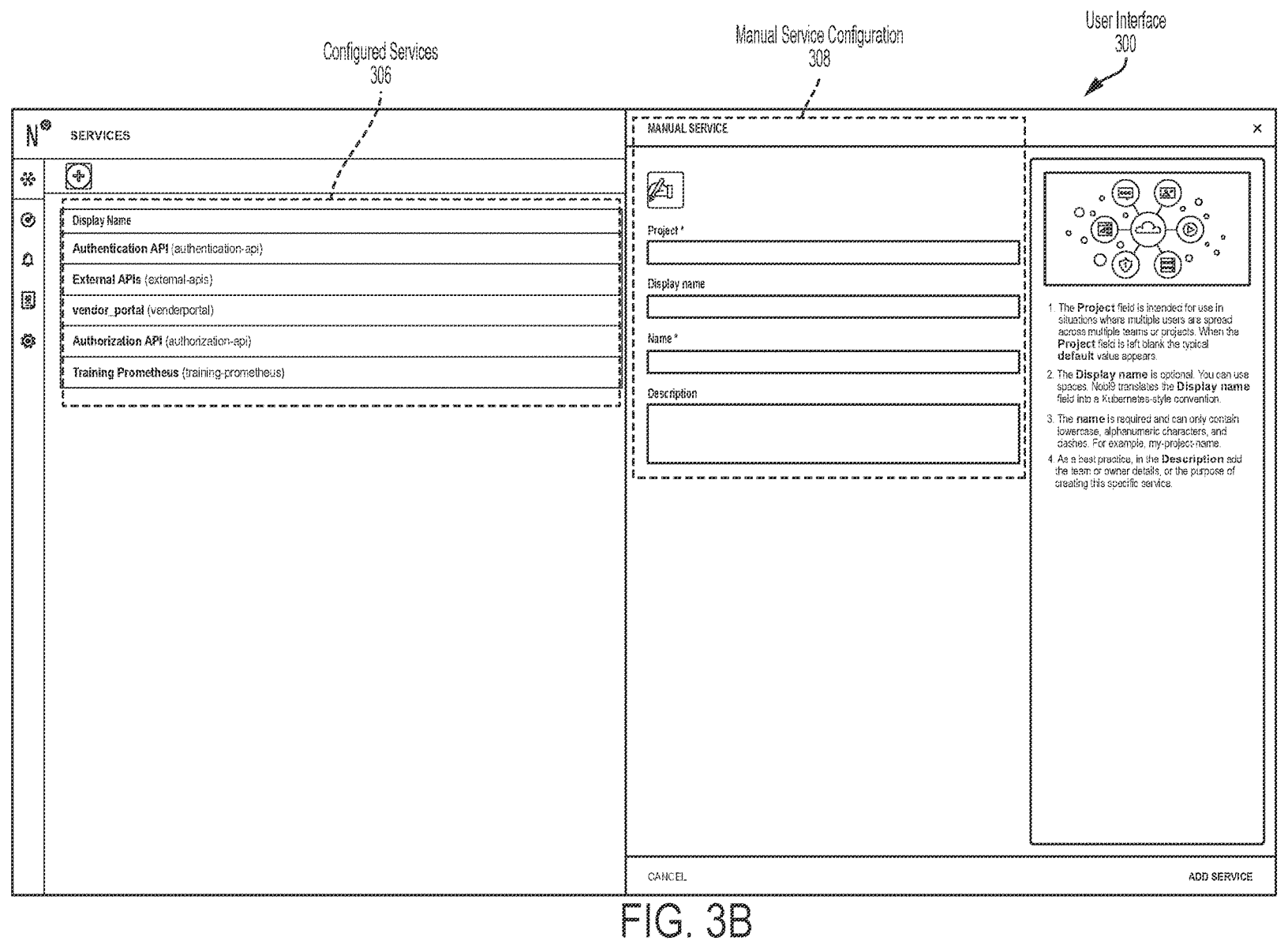

FIG. 3B illustrates an example of managing services in the user interface 300. Specifically, in FIG. 3B, a list of configured services 306 is provided. For each service, the list indicates both a display name and a unique identifier (which in this example must be in all lowercase letters, separated only by dashes). FIG. 3B also illustrates an example of manual service configuration 308, which in this example includes specifying a project, a display name, a unique identifier ("name"), and a description of the service.

Figure 3C:
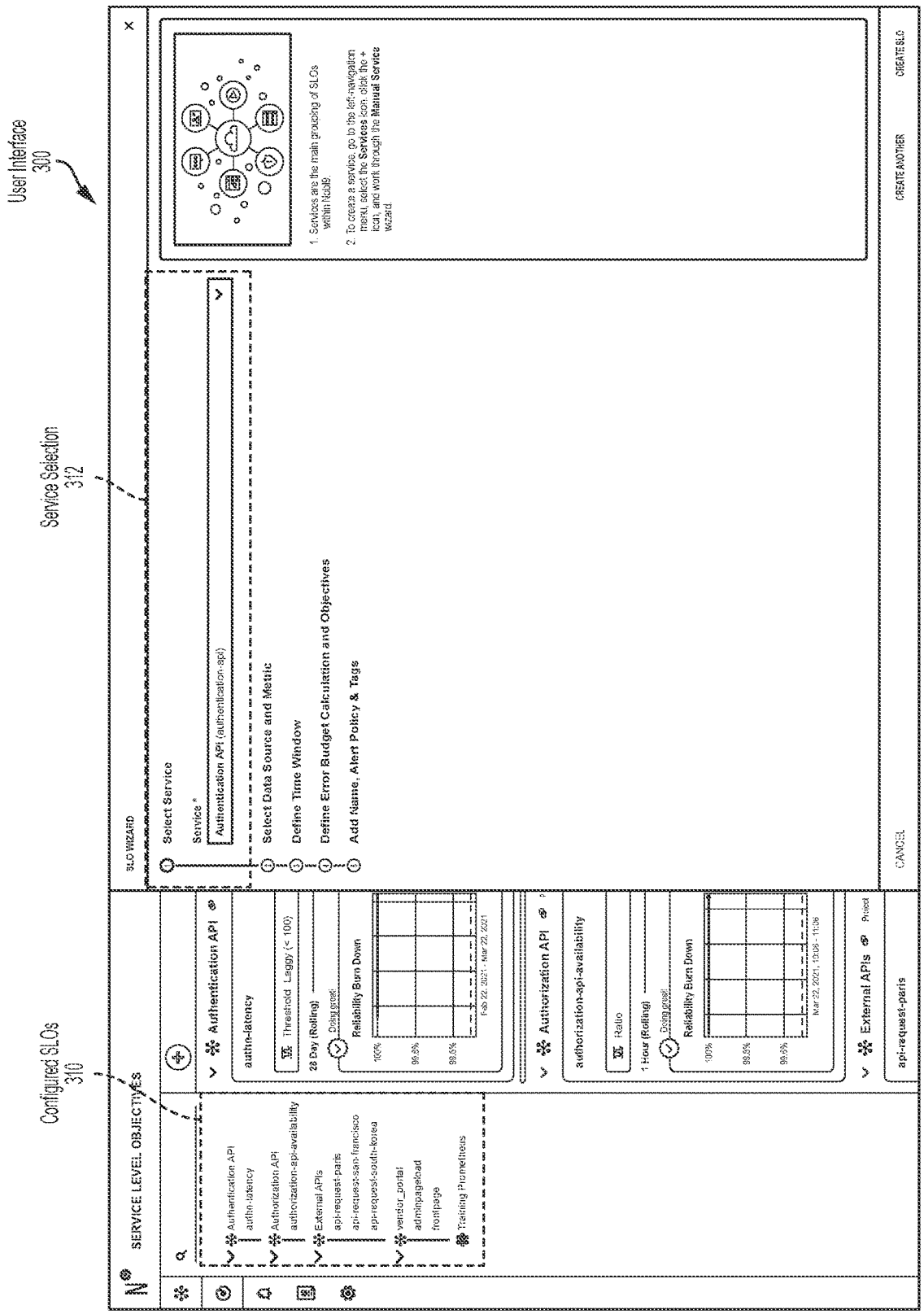
Figure 3D:
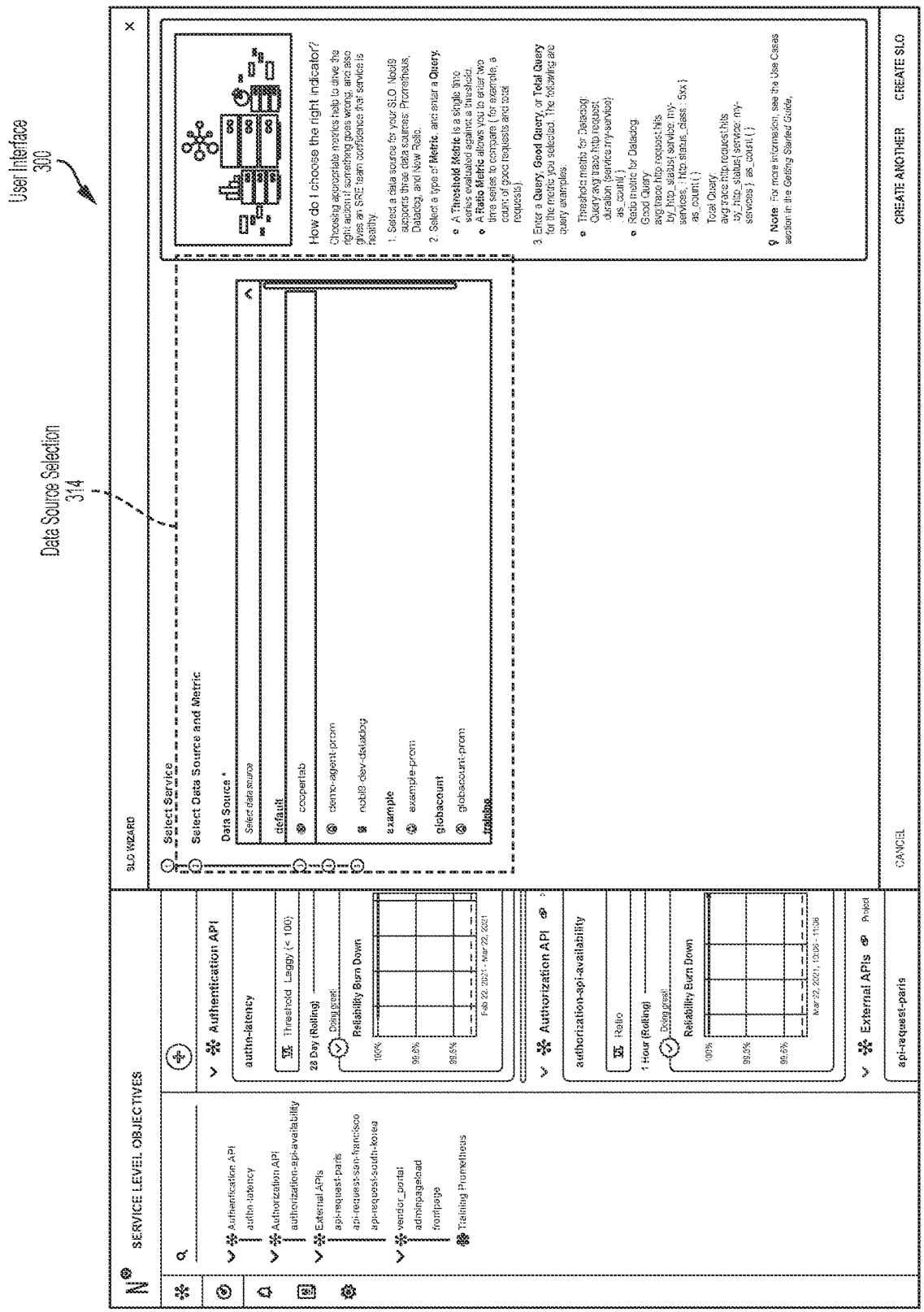
Figure 3E:
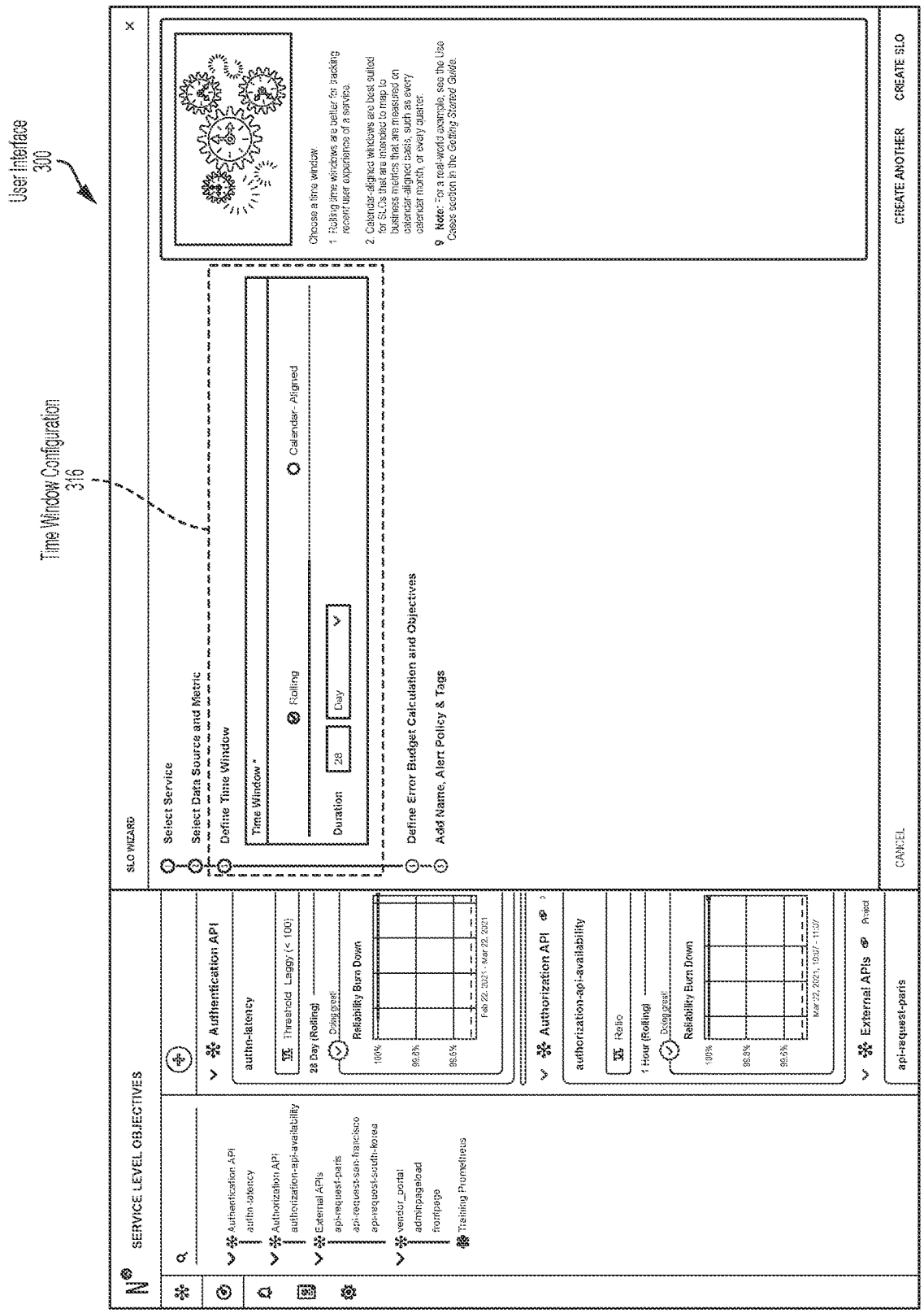
Figure 3F:
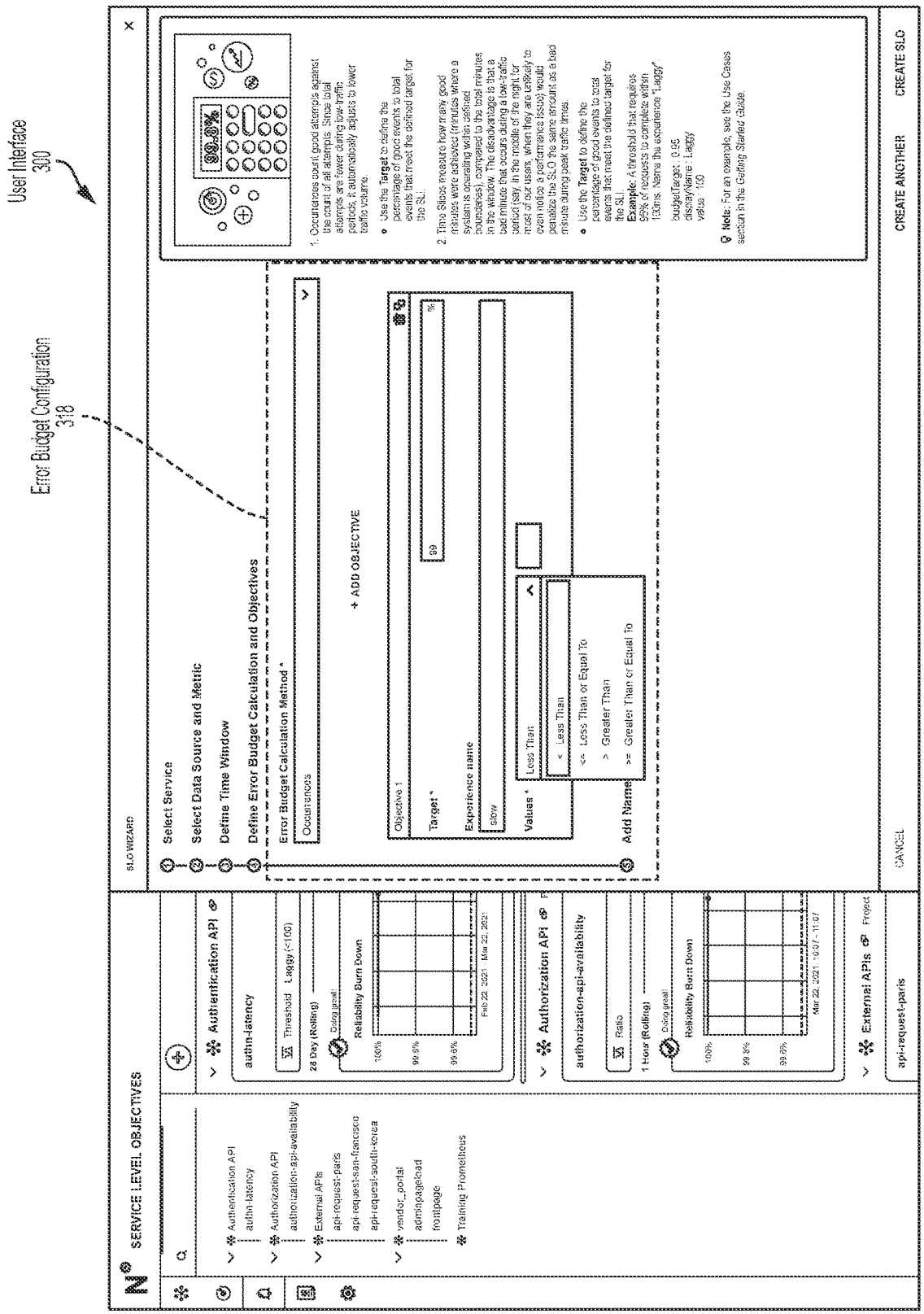
Figure 3G:
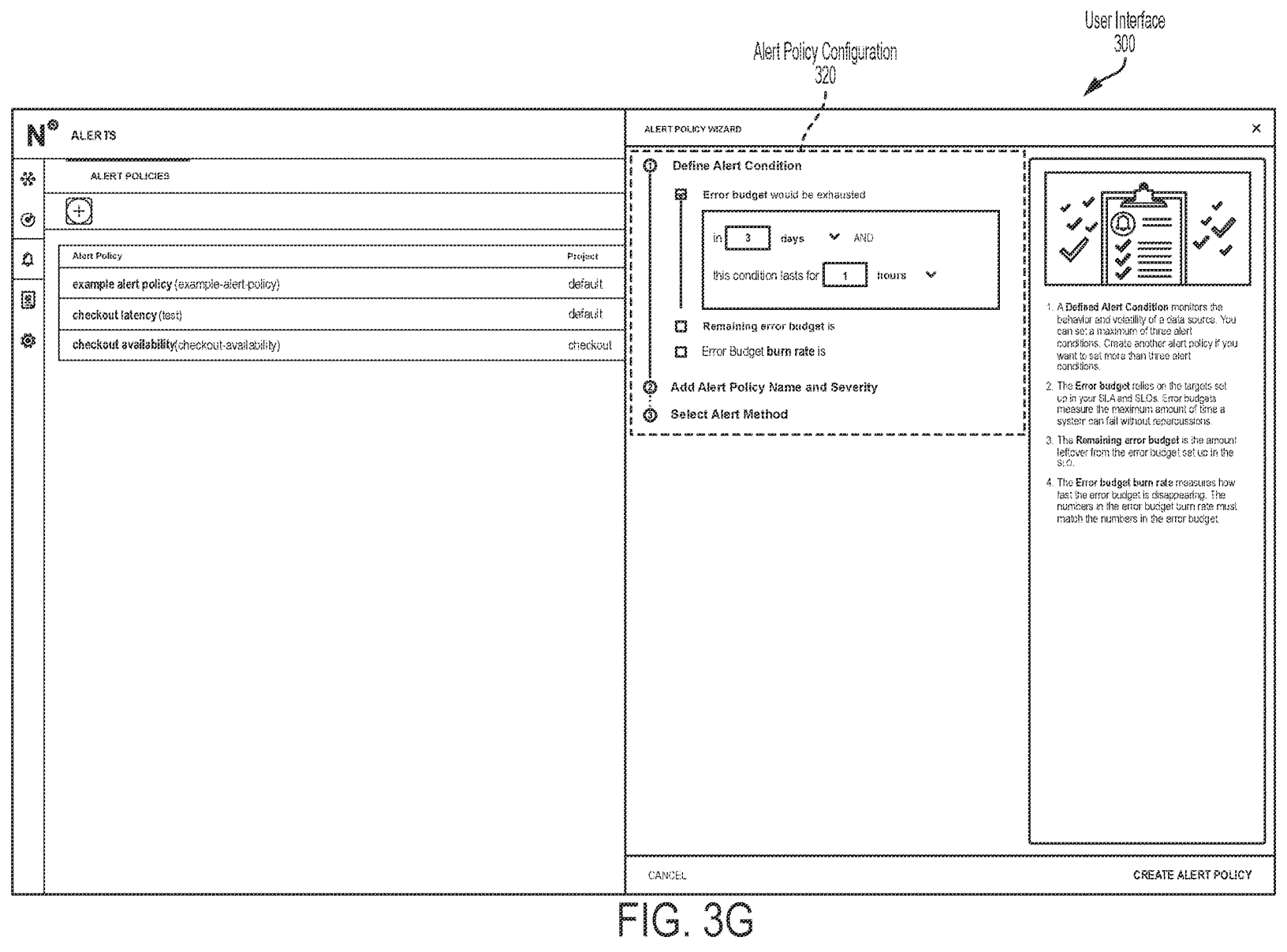

FIGS. 3C-3G illustrate an example of defining an SLO in the user interface 300. As shown in FIG. 3C, the user interface 300 includes a list of already-defined SLOs 310, grouped by the API associated with each SLO. FIG. 3C further shows an example of service selection 312 for a new SLO. In this example, the available services are provided in a dropdown menu, and a user may select from among the available services for the SLO. FIG. 3D illustrates an example of data source selection 314 for the SLO, again using a dropdown menu from which a user may select. FIG. 3E illustrates an example of time window configuration 316. In this example, tabs allow the user to select between rolling and calendar-aligned time windows, and controls in each tab allow the user to specify corresponding values (in this example, a unit of time and a value for that unit, e.g., 28 days). FIG. 3F illustrates an example of error budget configuration 318. In this example, a dropdown menu allows a user to select between occurrence-based and time-slice-based error budget calculations. The user may then use controls to specify a target for the error budget (e.g., a percentage of events, or a percentage of time slices), one or more values for the associated performance criterion (e.g., a number of milliseconds), and a comparison operator indicating how the value(s) should be evaluated (e.g., less than, greater than, less than or equal to, greater than or equal to, not equal to, equal to, between two values, etc.), and an "experience name" describing the user's experience when the performance criterion is not satisfied (e.g., "slow" or "laggy"). FIG. 3G illustrates an example of alert policy configuration 320. As illustrated in FIG. 3G, a user may specify an alert condition (in this example, when SLO monitoring indicates for at least one hour that the error budget would be exhausted in 3 days or less), a policy name and severity (not shown), and an alert method (not shown).

3.2. Data Visualizations

Figure 4A:
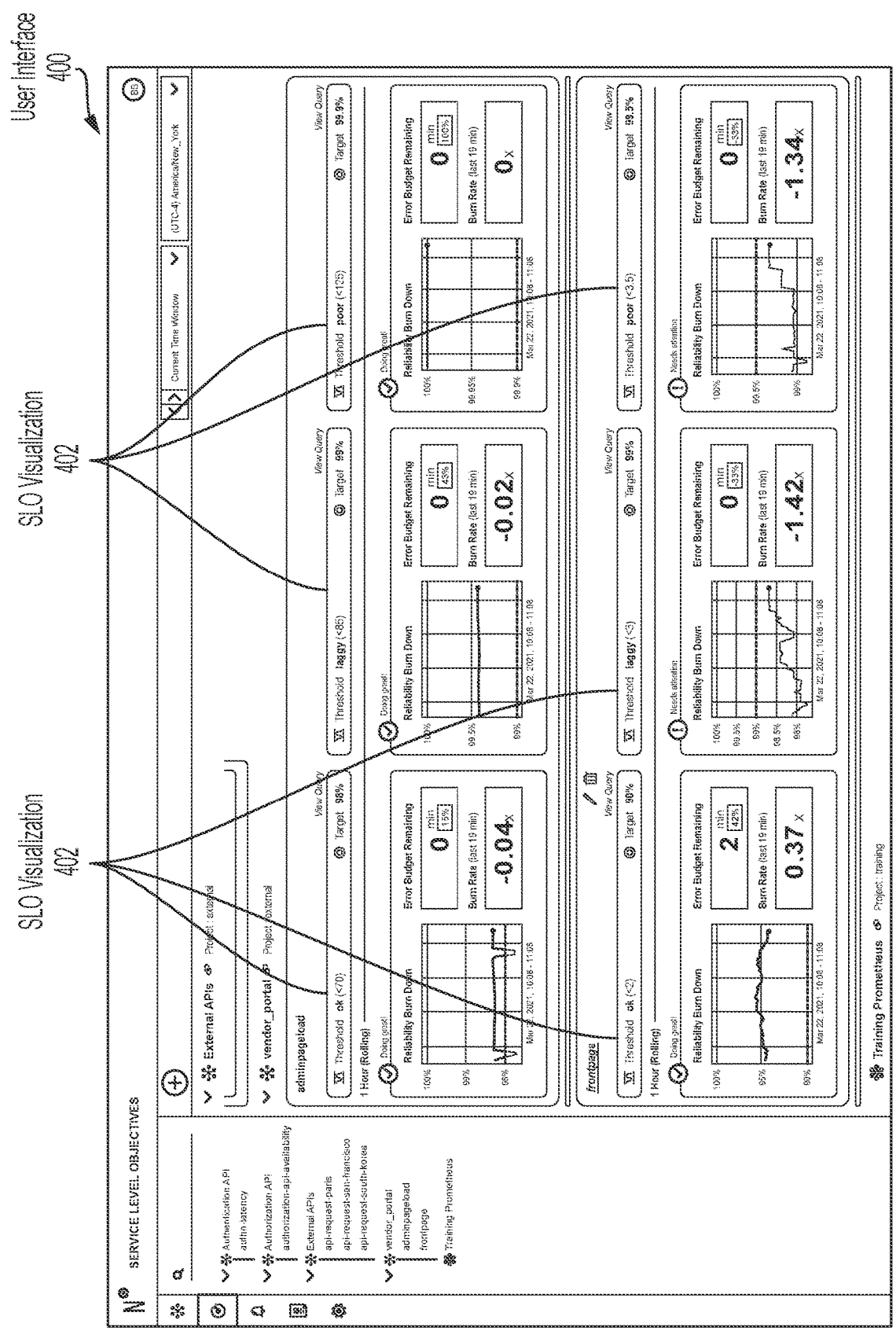
FIGS. 4A-4C illustrate examples of a user interface including data visualizations according to an embodiment.
Figure 4B:
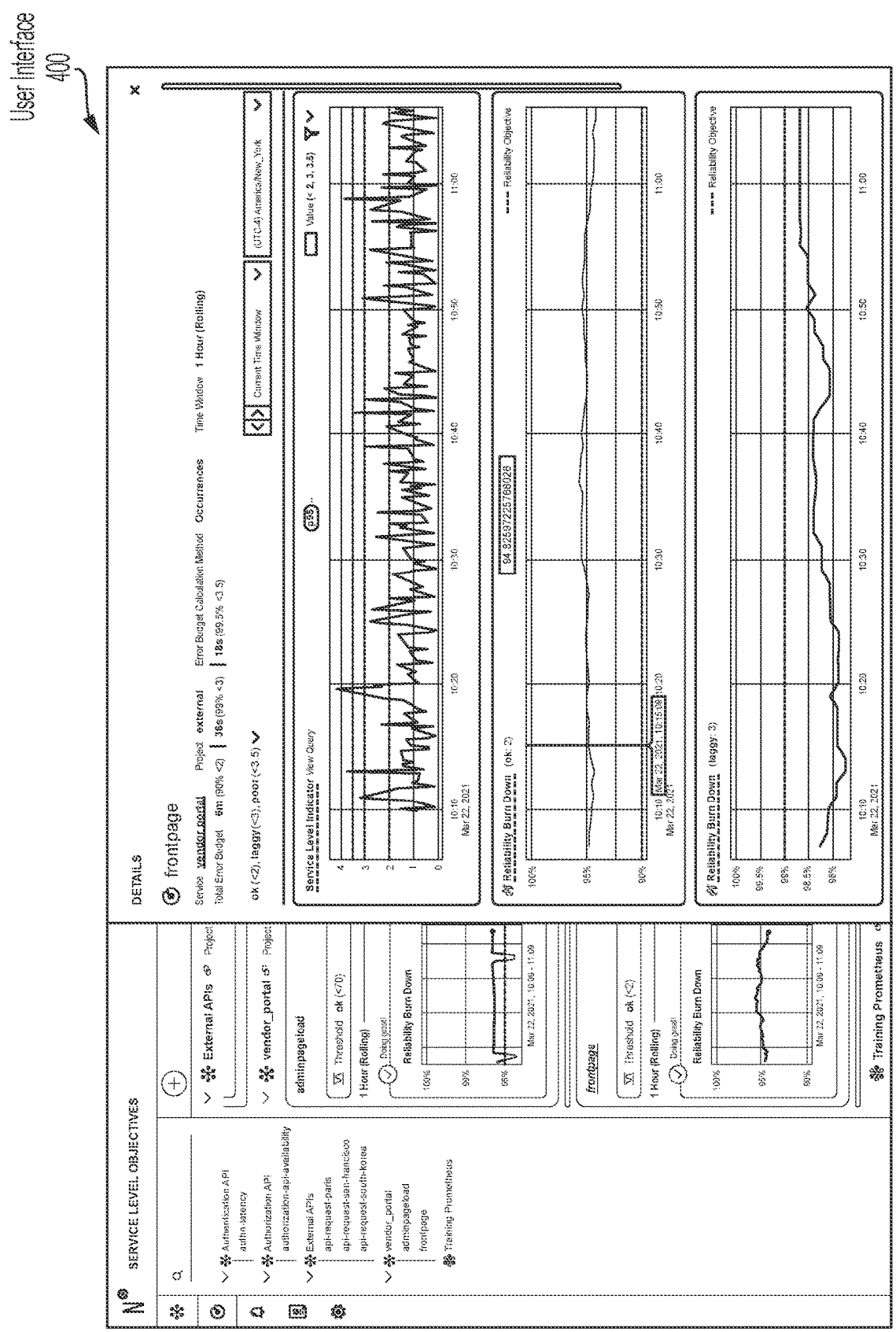
Figure 4C:
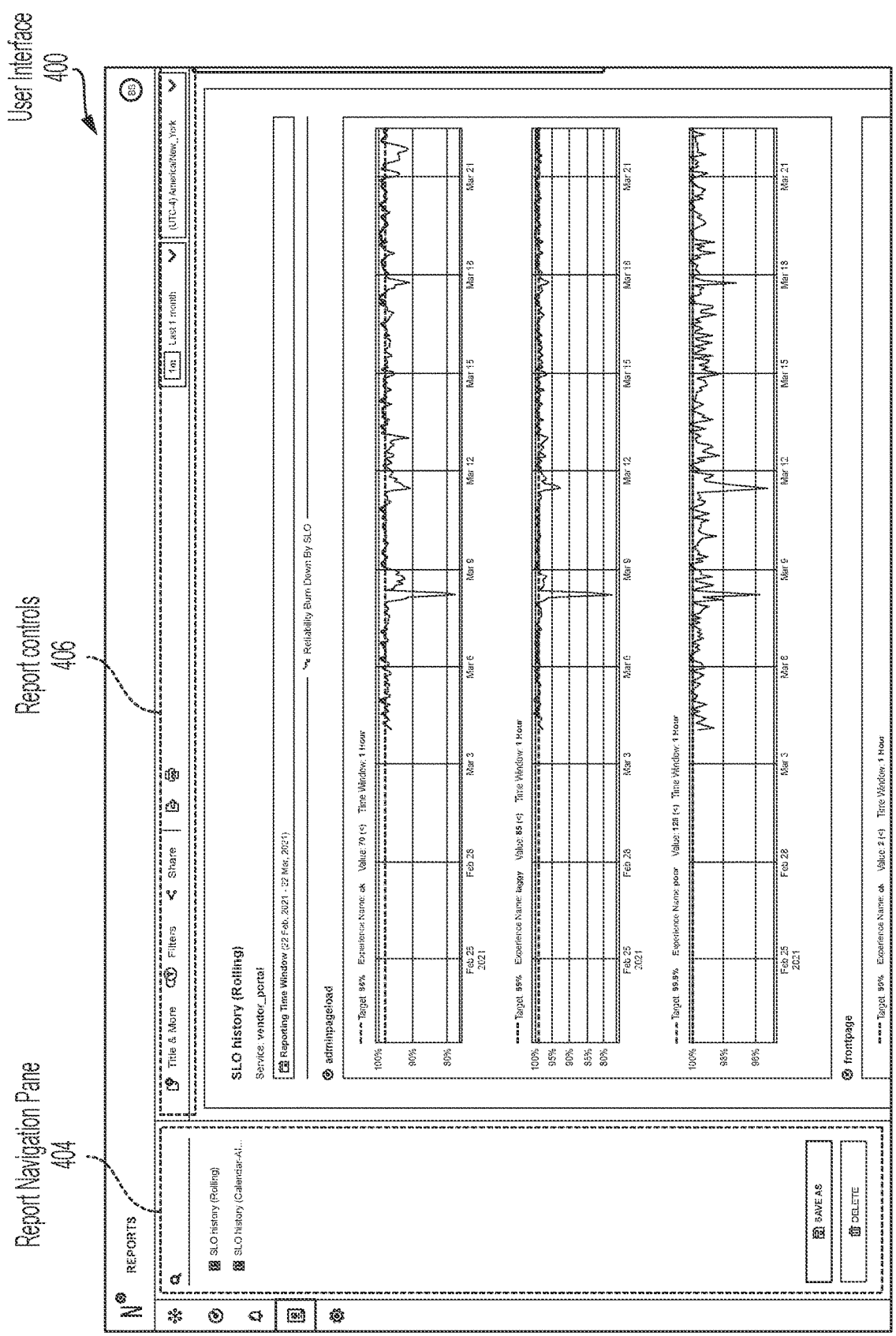

FIGS. 4A-4C illustrate examples of a user interface 400 including data visualizations according to an embodiment. In this example, the user interface 400 is a web application having multiple pages, sections, and workflows.

FIG. 4A illustrates an example of SLO visualizations 402 for two SLOs: one that tracks loading time on an admin page ("adminpageload") and another that monitors occurrences of negative events on the front page ("frontpage"). For each SLO, there are three error budgets, corresponding to different levels of performance ("ok," "laggy," and "poor"). Each SLO visualization 402 provides insight into performance against one of the error budgets. Specifically, in this example, each SLO visualization 402 includes a graph of performance evaluated against the performance criterion associated with the error budget. For example, for "adminpageload," the SLO visualization 402 for the "ok" error budget shows a graph of the percentage of response times under 70 ms. Each SLO visualization 402 further includes a measure of error budget remaining (in minutes and/or as a percentage) and an error budget burn rate (in this example, over the last 19 minutes). The SLO visualizations 402 thus provide a fast, intuitive way of monitoring the performance of one or more services, based on one or more performance criteria defined by one or more SLOs. In addition, links associated with each SLO visualization 402 allow a user to view the underlying query or queries.

FIG. 4B illustrates an example of a more detailed visualization of a particular SLO, in this example "frontpage." Here, more granular graphs for each error budget are available, in addition to a single graph that shows performance against all three error budget performance criteria. The visualization in FIG. 4B also shows more details about the SLO definition, including service name, project name, error budget calculation method, time window, and error budgets.

FIG. 4C illustrates an example of a reporting interface that provides a historical report of SLO performance. A report navigation pane 404 allows a user to select from available reports, create a new report (not shown), save a report, and/or delete a report. Within a report, report controls 406 allow a user to specify a timeframe for the report, a title for the report, apply one or more filters to the report, share the report with another user, export the report (e.g., to portable document format (PDF)), and/or print the report.

3.3. Command Line Tool

FIGS. 5A-5B illustrate examples of a user interface 500 including a command line tool according to an embodiment. As discussed above, an SLO platform may include an API that supports calls from a command line tool installed in the client environment. For example, the command line tool may be configured with one or more of a uniform resource locator (URL) of the SLO platform's API, the URL of an authorization server, and/or an organization name associated with the tenant. The command line tool may further be configured with a unique client identifier and client secret (access key) pair, which may be requested through a secure web interface of the SLO platform and downloaded to the client environment for use by the command line tool. Configuring the command line tool in this manner thus allows the command line tool to securely access functionality provided by the SLO platform's API. For example, the command line tool may provide access to functions for managing telemetry agents, services, and/or SLO definitions.

FIG. 5A illustrates an example of such a command line tool, in this example called "sloctl" (SLO Control). When sloctl is installed in a path configured for executable files, typing "sloctl help" at the command line outputs the help file for the tool, showing the various options. In this example, the option include: applying an SLO definition in the system from a YAML file ("apply"); setting a default project ("config"); configuring credentials for the SLO platform ("configure"); deleting an SLO definition by name or definition file ("delete"); displaying one or more resources ("get"); getting help about the command ("help"); and displaying the sloctl version ("version"). The help file further shows various flags available. FIG. 5B illustrates an example of using the "get" command to display a particular SLO definition.

In an embodiment, a command line tool provides an interface (i.e., other than a web browser or other kind of graphical user interface) for interacting with the SLO platform. A command line tool may also be scripted, so that certain SLO-related activities can be performed automatically when the script executes, for example in batch processing and/or in response to other system events (e.g., completion of another command and/or according to a particular schedule). For example, a command line tool may be used to create or update multiple SLO definitions at once, create or update multiple error budget thresholds, and/or update SLO definitions as part of continuous integration and continuous deployment (CI/CD). In general, a command line tool allows SLO definitions to be maintained as code, giving more control (at the expense of requiring more sophisticated knowledge) than when using a graphical user interfaced exclusively.

4. General; Computer Systems and Networks

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 6:
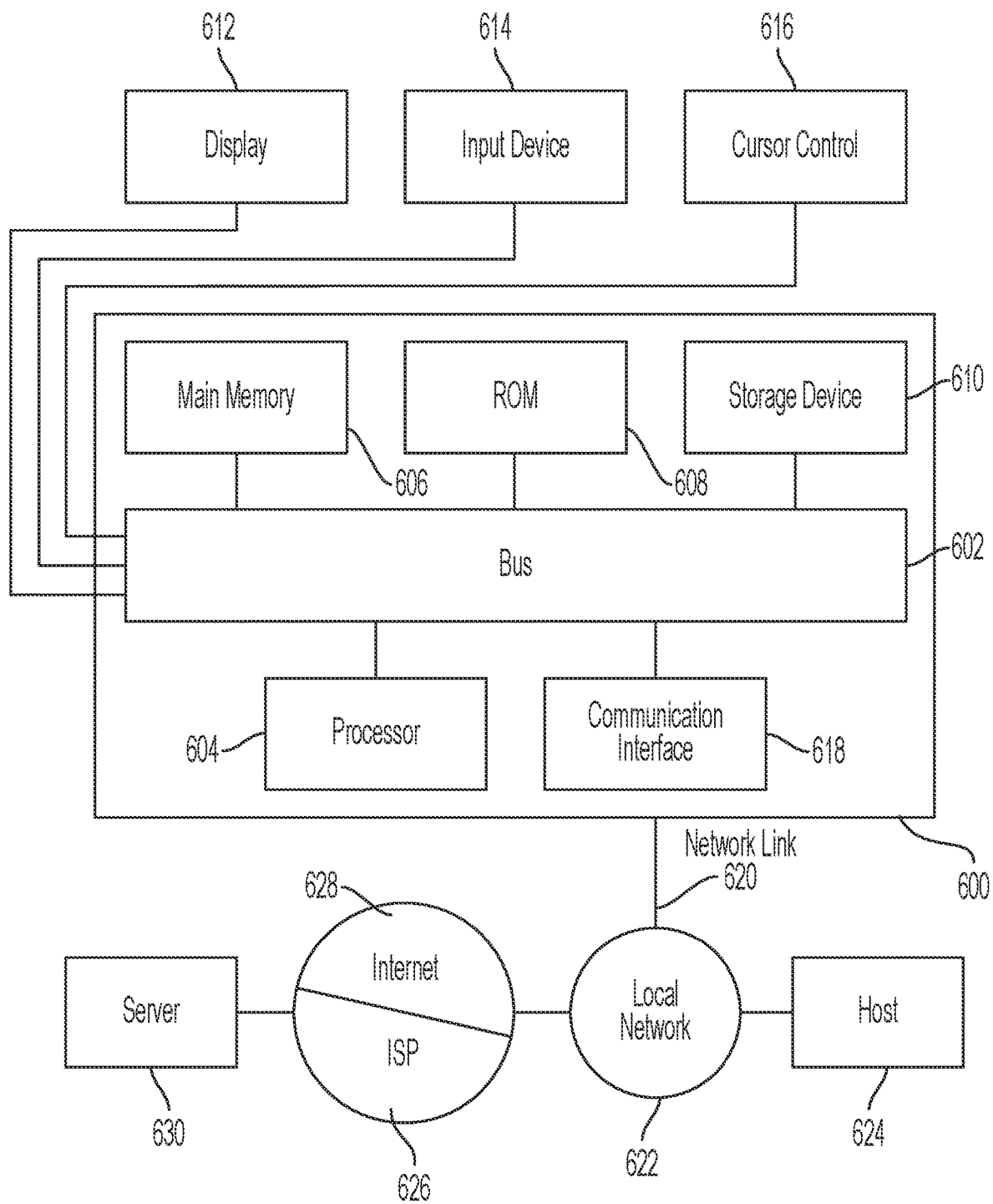
FIG. 6 is a block diagram of an example of a computer system according to an embodiment.

For example, FIG. 6 is a block diagram of an example of a computer system 600 according to an embodiment. Computer system 600 includes a bus 602 or other communication mechanism for communicating information, and a hardware processor 604 coupled with the bus 602 for processing information. Hardware processor 604 may be a general-purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in one or more non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), plasma display, electronic ink display, cathode ray tube (CRT) monitor, or any other kind of device for displaying information to a computer user. An input device 614, including alphanumeric and other keys, may be coupled to bus 602 for communicating information and command selections to processor 604. Alternatively or additionally, computer system 600 may receive user input via a cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Alternatively or additionally, computer system 6 may include a touchscreen. Display 612 may be configured to receive user input via one or more pressure-sensitive sensors, multi-touch sensors, and/or gesture sensors. Alternatively or additionally, computer system 600 may receive user input via a microphone, video camera, and/or some other kind of user input device (not shown).

Computer system 600 may implement the techniques described herein using customized hard-wired logic, one or more ASICs or FPGAs, firmware, and/or program logic which in combination with other components of computer system 600 causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 602. Transmission media may also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 600 may receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622, and communication interface 618.

The received code may be executed by processor 604 as it is received, and/or stored in storage device 610, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory computer-readable media storing instructions that, when executed by one or more processors, cause the one or more processors to perform operations comprising:
   storing, by a service level objective (SLO) platform, a first SLO definition of a first SLO comprising a first error budget for a first metric associated with a first service;
   storing, by the SLO platform, a second SLO definition of a second SLO comprising a second error budget for a second metric associated with a second service;
   obtaining, by the SLO platform, first telemetry data from a first data source associated with the first service;
   obtaining, by the SLO platform, second telemetry data from a second data source associated with the second service;
   monitoring, by the SLO platform, the first SLO at least by computing the first metric based on the first telemetry data and evaluating the first metric against the first error budget; and
   monitoring, by the SLO platform, the second SLO at least by computing the second metric based on the second telemetry data and evaluating the second metric against the second error budget;
   wherein the first metric is a ratio metric, and wherein the first SLO definition comprises (a) a first query to obtain a numerator value based on the first telemetry data and (b) a second query to obtain a denominator value based on the first telemetry data.

2. The one or more non-transitory computer-readable media of claim 1, the SLO platform being a software-as-a-service (SaaS) platform for a plurality of tenants, the first SLO and the first service being associated with a first tenant in the plurality of tenants, and the second SLO and the second service being associated with a second tenant in the plurality of tenants.

3. The one or more non-transitory computer-readable media of claim 1, the first SLO definition further comprising a time window, the time window being one of a rolling time window or a calendar-based time window.

4. The one or more non-transitory computer-readable media of claim 3, the first error budget being calculated based on at least one of a target number of events in the time window that satisfy a performance criterion or a target number of time slices in the time window that satisfy the performance criterion.

5. The one or more non-transitory computer-readable media of claim 1, the operations further comprising:
   storing, by the SLO platform, an alert policy associated with the first SLO;
   while monitoring the first SLO, determining that the alert policy is satisfied; and
   responsive to determining that the alert policy is satisfied, generating an alert.

6. A system comprising:
   at least one device including a hardware processor;
   the system being configured to perform operations comprising:
      storing, by a service level objective (SLO) platform, a first SLO definition of a first SLO comprising a first error budget for a first metric associated with a first service;
      storing, by the SLO platform, a second SLO definition of a second SLO comprising a second error budget for a second metric associated with a second service;
      obtaining, by the SLO platform, first telemetry data from a first data source associated with the first service;
      obtaining, by the SLO platform, second telemetry data from a second data source associated with the second service;
      monitoring, by the SLO platform, the first SLO at least by computing the first metric based on the first telemetry data and evaluating the first metric against the first error budget; and
      monitoring, by the SLO platform, the second SLO at least by computing the second metric based on the second telemetry data and evaluating the second metric against the second error budget;
   wherein the first metric is a ratio metric, and wherein the first SLO definition comprises (a) a first query to obtain a numerator value based on the first telemetry data and (b) a second query to obtain a denominator value based on the first telemetry data.

7. The system of claim 6, the SLO platform being a software-as-a-service (SaaS) platform for a plurality of tenants, the first SLO and the first service being associated with a first tenant in the plurality of tenants, and the second SLO and the second service being associated with a second tenant in the plurality of tenants.

8. The system of claim 6, the first SLO definition further comprising a time window, the time window being one of a rolling time window or a calendar-based time window.

9. The system of claim 8, the first error budget being calculated based on at least one of a target number of events in the time window that satisfy a performance criterion or a target number of time slices in the time window that satisfy the performance criterion.

10. The system of claim 6, the operations further comprising:
    storing, by the SLO platform, an alert policy associated with the first SLO;
    while monitoring the first SLO, determining that the alert policy is satisfied; and responsive to determining that the alert policy is satisfied, generating an alert.

11. A method comprising:
    storing, by a service level objective (SLO) platform, a first SLO definition of a first SLO comprising a first error budget for a first metric associated with a first service;
    storing, by the SLO platform, a second SLO definition of a second SLO comprising a second error budget for a second metric associated with a second service;
    obtaining, by the SLO platform, first telemetry data from a first data source associated with the first service;
    obtaining, by the SLO platform, second telemetry data from a second data source associated with the second service;

monitoring, by the SLO platform, the first SLO at least by computing the first metric based on the first telemetry data and evaluating the first metric against the first error budget; and monitoring, by the SLO platform, the second SLO at least by computing the second metric based on the second telemetry data and evaluating the second metric against the second error budget;

wherein the first metric is a ratio metric, and wherein the first SLO definition comprises (a) a first query to obtain a numerator value based on the first telemetry data and (b) a second query to obtain a denominator value based on the first telemetry data.

12. The method of claim 11, the SLO platform being a software-as-a-service (SaaS) platform for a plurality of tenants, the first SLO and the first service being associated with a first tenant in the plurality of tenants, and the second SLO and the second service being associated with a second tenant in the plurality of tenants.

13. The method of claim 11, the first SLO definition further comprising a time window, the time window being one of a rolling time window or a calendar-based time window, and the first error budget being calculated based on at least one of a target number of events in the time window that satisfy a performance criterion or a target number of time slices in the time window that satisfy the performance criterion.

14. The method of claim 11, further comprising:

storing, by the SLO platform, an alert policy associated with the first SLO;

while monitoring the first SLO, determining that the alert policy is satisfied; and responsive to determining that the alert policy is satisfied, generating an alert.

* * * * *